(12) United States Patent
Liu

(10) Patent No.: US 6,454,155 B1
(45) Date of Patent: Sep. 24, 2002

(54) STROKE AND PRESSURE ADJUSTING DEVICE FOR SOLDER MACHINE

(75) Inventor: Kang Ting Liu, Kaohsiung (TW)

(73) Assignee: Hannstar Display Corp. (TW)

( * ) Notice: Subject to any disclaimer, the term of this patent is extended or adjusted under 35 U.S.C. 154(b) by 0 days.

(21) Appl. No.: 09/933,728

(22) Filed: Aug. 22, 2001

(30) Foreign Application Priority Data

Mar. 21, 2001 (TW) .......................... 090106837

(51) Int. Cl.$^7$ .......................... B23K 37/02; B23K 31/02
(52) U.S. Cl. .......................... 228/45; 228/4.5; 228/24; 228/32
(58) Field of Search .......................... 228/24, 1.1, 4.5, 228/33, 32, 45, 25

(56) References Cited

U.S. PATENT DOCUMENTS

| | | | | |
|---|---|---|---|---|
| 3,684,151 A | * | 8/1972 | Burman et al. | 118/423 |
| 3,750,255 A | * | 8/1973 | Stanley | 228/44.3 |
| 4,224,494 A | * | 9/1980 | Reboux et al. | 219/615 |
| 4,392,604 A | * | 7/1983 | Sears | 219/124.34 |
| 4,464,977 A | * | 8/1984 | Brundage | 137/528 |
| 4,596,271 A | * | 6/1986 | Brundage | 137/529 |
| 4,731,923 A | * | 3/1988 | Yagi et al. | 228/6.2 |
| 4,784,582 A | * | 11/1988 | Howseman, Jr. | 222/378 |
| 4,967,940 A | * | 11/1990 | Blette et al. | 222/109 |
| 5,058,779 A | * | 10/1991 | Surdilla | 222/309 |
| 5,320,250 A | * | 6/1994 | La et al. | 222/1 |
| 5,647,117 A | * | 7/1997 | Kurita | 200/302.1 |
| 5,875,922 A | * | 3/1999 | Chastine et al. | 222/1 |
| 5,887,768 A | * | 3/1999 | Price et al. | 222/486 |
| 5,913,455 A | * | 6/1999 | La et al. | 222/146.5 |
| 5,975,488 A | * | 11/1999 | Imhof et al. | 251/129.1 |
| 5,985,064 A | * | 11/1999 | Sato | 156/360 |
| 6,112,656 A | * | 9/2000 | Asai et al. | 101/123 |
| 6,161,277 A | * | 12/2000 | Asai et al. | 198/586 |
| 6,318,599 B2 | * | 11/2001 | Estelle et al. | 222/146.5 |

* cited by examiner

*Primary Examiner*—M. Alexandra Elve
*Assistant Examiner*—Kiley Stoner

(57) ABSTRACT

A stroke and pressure adjusting device is used for the soldering process of a soldering machine which has a driving device for driving a soldering device of the soldering machine to solder, and the driving device has a driving shaft on which the stroke and pressure adjusting device is attached. The stroke and pressure adjusting device comprises a thread sleeve mounted on the driving shaft of the driving device, a slider mounted on the thread sleeve, and a spring mounted between the slider and the driving device, wherein the distance between the thread sleeve and the driving device is adjustable so as to adjust the stroke of the driving device, the distance between the slider and the driving device is adjustable and the distance between the slider and the driving device is adjustable so as to adjust the elastic force generated by the spring, thereby adjusting the operating pressure of the driving device.

4 Claims, 3 Drawing Sheets

STROKE AND PRESSURE ADJUSTING DEVICE FOR SOLDER MACHINE

BACKGROUND OF THE INVENTION

1. Field of the Invention

The present invention generally relates to a stroke and pressure adjusting device for soldering machine, more particularly to a soldering machine that has a stroke and pressure adjusting device in co-axial alignment with the driving device of the soldering machine.

2. Description of the Related Art

Due to the advance of electronic technology, integrated circuit device has been applied to various electronic products. In the manufacturing process of the electronic products, the surface mount technology is usually utilized to electrically connect and mount electronic members to the substrate. Typically, there are solder materials on the electrically connecting points of the electronic members or the substrates, and the connecting points are heated by the soldering machine to melt and reflow the solder materials during the soldering process. Then, the melted soldering materials wet the surface of the connecting points due to the surface tension, and the electronic members can be electrically connected and mounted to the substrate after cooling down.

Moreover, with the advantages of low-energy consuming, low-heat dissipation, light-weight and non-luminescence display, liquid crystal displays (LCD) have been widely used in the electronic products and even have replaced the conventional cathode-ray tube (CRT) displays.

In the manufacturing of the liquid crystal display module, the driving integrated circuit and the controlling integrated circuit are attached to the liquid crystal display cell by means of surface mount technology. Now referring to the FIG. 1, it depicts a conventional soldering machine 10. The soldering machine 10 generally has a bracket 14 for holding a carrier 22 thereon. The carrier 22 is provided with a pneumatic cylinder 12 having a driving shaft connected to a floating connector 16 which is mounted on the soldering device 23 of the soldering machine 10 with a soldering head 20. The soldering device 23 is further connected to the bottom of the cylinder 12 by a spring 18, thereby providing an upward reverting elastic force for the soldering device 23.

In fact, in the soldering machine 10, the operating stroke of the soldering head 20 can be adjusted by the floating connector 16. However, in this arrangement, due to the floating connector 16 positioned behind the spring 18, the adjustment of the floating connector 16 is influenced by the spring 18. Moreover, a lateral force to the cylinder is generated by the reverting force of the spring 18 due to the offset between the axis a of the cylinder 12 and the axis b of the spring 18, and it will be appreciated by those skilled in the art that the lateral force may cause the damage of the seal between the cylinder and the driving shaft thereof, and then the lifetime of the cylinder may substantially reduced.

Also, for this arrangement, the user often need to change the length of the spring 18 to adjust the reverting force of the spring 18, and thereby adjusting the mounting pressure of the soldering machine 10. However, it will be appreciated by those skilled in the art that the approach to change the length of the spring is not precise, and thus the mounting pressure may not be precisely adjusted.

Accordingly, there exist needs for providing a stroke and pressure for the soldering process of a soldering machine, in which the stroke and pressure adjusting device is co-axial with the driving device of the soldering machine, and the mounting pressure can be precisely adjusted.

SUMMARY OF THE INVENTION

It is a primary object of the present invention to provide a stroke and pressure for the soldering process of a soldering machine, in which the stroke and pressure adjusting device is co-axial with the driving device of the soldering machine.

It is another object of the present invention to provide a stroke and pressure for the soldering process of a soldering machine, in which the mounting operating pressure of the soldering head of the soldering machine can be precisely adjusted.

In order to achieve the objects mentioned hereinabove, the present invention provides a stroke and pressure adjusting device for the soldering process of a soldering machine which has a driving device for driving a soldering device of the soldering machine to solder, and the driving device has a driving shaft on which the stroke pressure adjusting device is attached.

The stroke and pressure adjusting device comprises a thread sleeve mounted on the driving shaft of the driving device, a slider mounted on the thread sleeve, and a spring mounted between the slider and the driving device, wherein the distance between the thread sleeve and the driving device is adjustable so as to adjust the stroke of the driving device, the distance between the slider and the driving device is adjustable and the distance between the slider and the driving device is adjustable so as to adjust the elastic force generated by the spring, thereby adjusting the operating pressure of the driving device.

According to an aspect of the stroke and pressure adjusting device for the soldering process of a soldering machine of the present invention, the driving device of the soldering machine is a pneumatic cylinder.

According to another aspect of the stroke and pressure adjusting device for the soldering process of a soldering machine of the present invention, the driving device of the soldering machine is a hydraulic cylinder.

Accordingly, the stroke and pressure adjusting device according to the present invention is co-axially aligned with the driving device of the soldering machine, so the elastic force generated by the spring is concentric with the driving device and the lateral force is not generated, thereby elongating the life of the driving device. Moreover, the stroke and pressure adjusting device according to the present invention is able to easily and precisely adjust the stroke of the driving device without interference with other structures.

BRIEF DESCRIPTION OF THE DRAWINGS

Other objects, advantages, and novel features of the invention will become more apparent from the following detailed description when taken in conjunction with the accompanying drawings.

DESCRIPTION OF THE PREFERRED EMBODIMENT

Figure 1:
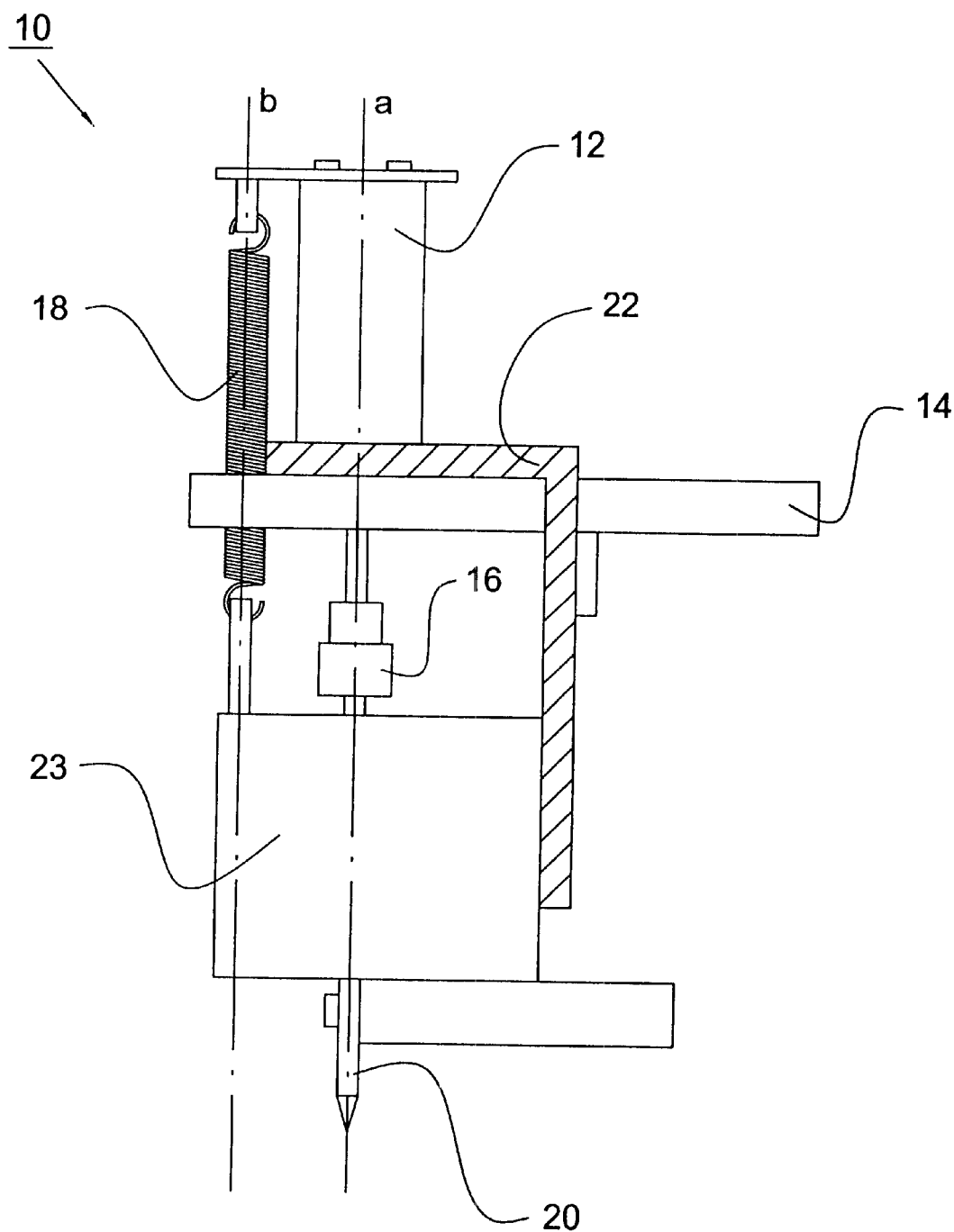
FIG. 1 is a side schematic view of a stroke and pressure adjusting device of a soldering machine according to the prior art.
Figure 2:
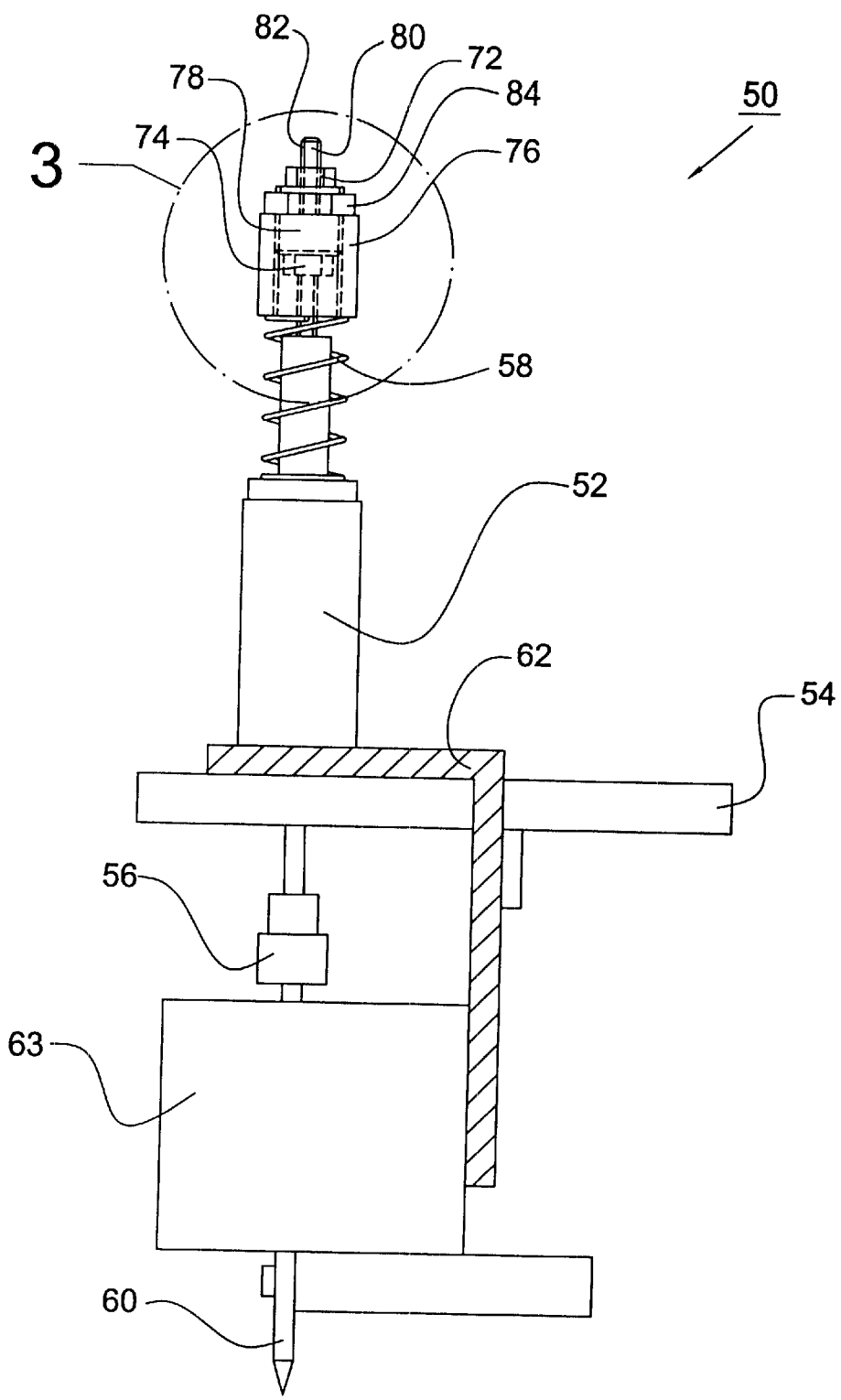
FIG. 2 is a side schematic view of a stroke and pressure adjusting device of a soldering machine according to an embodiment of the present invention.

Now referring to FIG. 2, it depicts a soldering machine 50 according to a preferred embodiment of the present invention. The soldering machine 50 generally comprises a bracket 54 for holding a carrier 62 thereon. The carrier 62 is provided with a pneumatic cylinder 52 having a driving shaft connected to a floating connector 56 which is connected to the soldering device 63 of the soldering machine 50 with a soldering head 60. The cylinder 52 has a tail shaft 80 at the other side opposite to the floating connector 56, and the tail shaft 80 is co-axial with the driving shaft. It will be appreciated by those skilled in the art that the pneumatic cylinder 52 is a driving device which can be alternated by a hydraulic cylinder.

Figure 3:
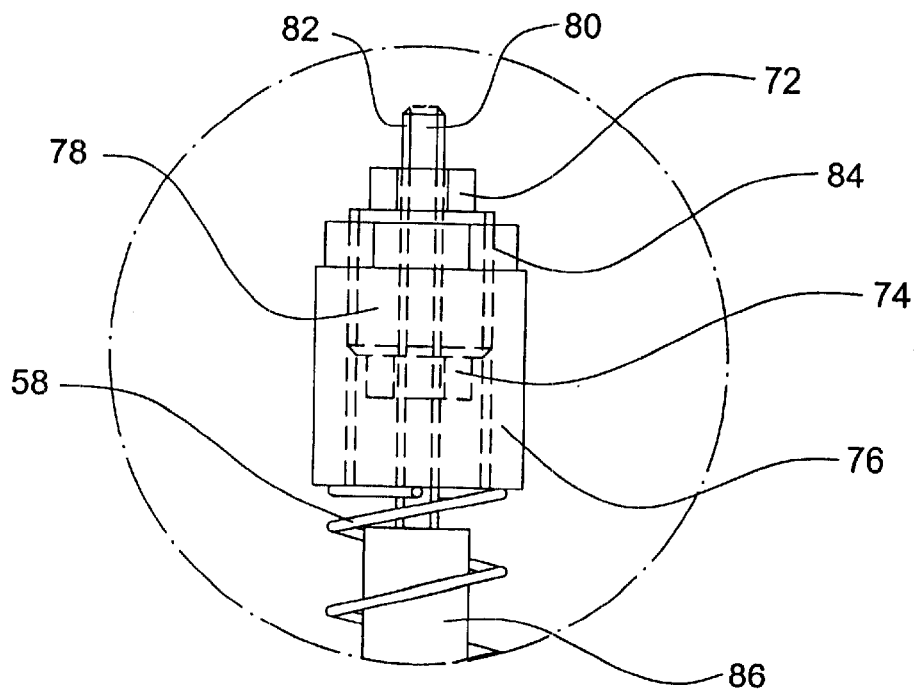
FIG. 3 is a partial enlarged schematic view of the stroke and pressure adjusting device of the soldering machine according to the embodiment shown in FIG. 2.
Figure 4:
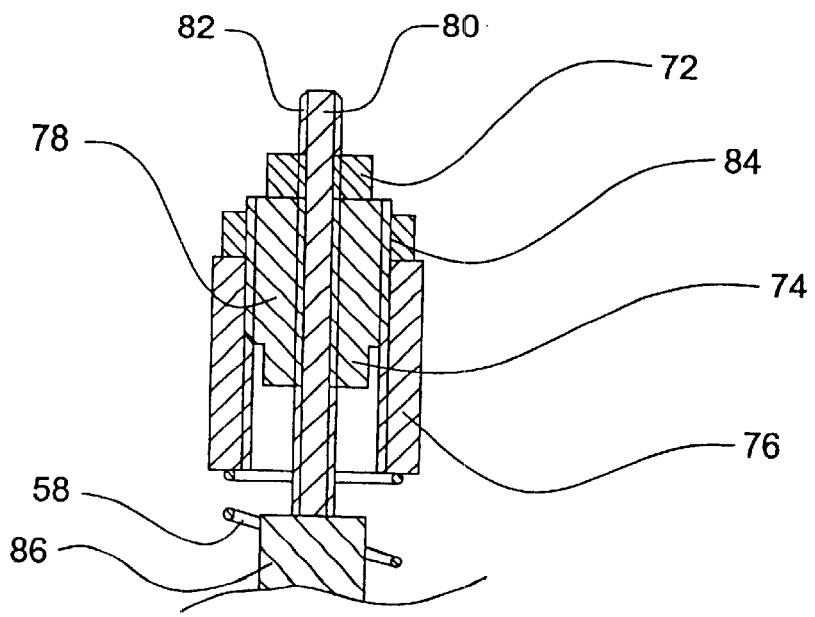
FIG. 4 is a partial enlarged sectional schematic view of the stroke and pressure adjusting device of the soldering machine according to the embodiment shown in FIG. 2.

Now referring to FIGS. 3 and 4, they depict the tail shaft 80. The tail shaft 80 has outer threads 82 for engagement with a thread sleeve 78, and the thread sleeve 78 has inner threads for engaging the threads 82 of the tail shaft 80, outer threads, and a bolt head 74 for cooperating with a nut 72 to fix the thread sleeve 78 on the tail shaft 80 in position.

Also, the tail shaft 80 of the soldering machine 50 further comprise a slider 76 which has inner threads for engaging the outer threads of the thread sleeve 78, and a spring 58 disposed between the slider 76 and the cylinder 52 of the soldering machine 50. The tail shaft 80 further comprises a nut 84, and the slider 76 has a no-round portion for cooperating with the nut 84 to fix the slider 76 on the thread sleeve 78 in position.

In the above-mentioned configuration, the stroke of the cylinder 52 (the distance between the bottom of the bolt head 74 of the threaded sleeve 78 and a shoulder 86 of the cylinder 52) can be easily adjusted, and the mounting stroke of soldering head 60 can be adjusted simultaneously. Also, the compression of the spring can be easily adjusted by means of adjusting the distance of the slider 76 relative to the cylinder 52 so as to adjust the reverting force of the spring, and the mounting pressure of the soldering head 60 can be adjusted simultaneously.

As mentioned above, the operator can easily adjust the stroke and pressure of the soldering head of the soldering machine by means of the thread sleeve and the slider. Therefore, the soldering process of the soldering machine can proceed rapidly and precisely.

Although the invention has been explained in relation to its preferred embodiment, it is to be understood that many other possible modifications and variations can be made without departing from the spirit and scope of the invention as hereinafter claimed.

What is claimed is:

1. A stroke and pressure adjusting device for a soldering process of a soldering machine which has a driving device with a driving shaft for driving a soldering device of the soldering machine to solder, the stroke and pressure adjusting device comprising:

a thread sleeve mounted on the driving shaft of the driving device, and a distance between the thread sleeve and the driving device being adjustable so as to adjust the stroke of the driving device;

a slider mounted on the thread sleeve and a distance between the slider and the driving device being adjustable; and a spring disposed between the slider and the driving device, and the distance between the slider and the driving device being adjustable so as to adjust an elastic force generated by the spring, thereby adjusting the operating pressure of the driving device.

2. A stroke and pressure adjusting device as claimed in claim 1, wherein the soldering machine is used for manufacturing of the liquid crystal display.

3. A stroke and pressure adjusting device as claimed in claim 1, wherein the driving device of the soldering machine is a pneumatic cylinder.

4. A stroke and pressure adjusting device as claimed in claim 1, wherein the driving device of the soldering machine is a hydraulic cylinder.

* * * * *